US012435497B2

(12) United States Patent
Städtler

(10) Patent No.: US 12,435,497 B2
(45) Date of Patent: Oct. 7, 2025

(54) SANITARY OUTLET UNIT AND METHOD FOR INSTALLING AND/OR REMOVING A SANITARY OUTLET UNIT OF THIS TYPE

(71) Applicant: Neoperl GmbH, Müllheim (DE)

(72) Inventor: Georg Städtler, Müllheim (DE)

(73) Assignee: Neoperl GmbH, Müllheim (DE)

( * ) Notice: Subject to any disclaimer, the term of this patent is extended or adjusted under 35 U.S.C. 154(b) by 207 days.

(21) Appl. No.: 18/036,806

(22) PCT Filed: Oct. 22, 2021

(86) PCT No.: PCT/EP2021/079415
§ 371 (c)(1),
(2) Date: May 12, 2023

(87) PCT Pub. No.: WO2022/106153
PCT Pub. Date: May 27, 2022

(65) Prior Publication Data

US 2023/0407611 A1 Dec. 21, 2023

(30) Foreign Application Priority Data

Nov. 19, 2020 (DE) ......................... 202020106639.0

(51) Int. Cl.
*E03C 1/04* (2006.01)
*B05B 12/00* (2018.01)
*B05B 15/65* (2018.01)

(52) U.S. Cl.
CPC .......... *E03C 1/0404* (2013.01); *B05B 12/002* (2013.01); *B05B 15/65* (2018.02)

(58) Field of Classification Search
CPC ...... E03C 1/0404; E03C 1/0405; E03C 1/086; B05B 1/1636; B05B 12/002; B05B 15/65
See application file for complete search history.

(56) References Cited

U.S. PATENT DOCUMENTS

| | | | |
|---|---|---|---|
| 4,221,337 A | 9/1980 | Shames et al. | |
| 5,383,604 A * | 1/1995 | Boesch | B05B 1/1618 239/447 |
| 2009/0277521 A1 | 11/2009 | Weis et al. | |
| 2019/0301148 A1* | 10/2019 | Schurle | E03C 1/084 |
| 2020/0190778 A1 | 6/2020 | Vogeli | |

FOREIGN PATENT DOCUMENTS

| | | |
|---|---|---|
| CN | 200949674 Y | 9/2007 |
| CN | 102606802 | 7/2012 |
| CN | 102918214 B | 6/2014 |
| CN | 105201049 B | 6/2018 |
| CN | 216555442 U | 5/2022 |
| DE | 1090593 | 10/1960 |
| DE | 202007007667 | 11/2007 |
| DE | 102008038729 | 12/2009 |
| DE | 102009021410 | 2/2010 |

(Continued)

*Primary Examiner* — Eric Keasel
(74) *Attorney, Agent, or Firm* — Volpe Koenig

(57) ABSTRACT

In a sanitary outlet unit (1), a main body (2) and a handle (5), which is accessible from outside, are arranged so as to be movable relative to each other between a coupled position and an uncoupled position, so that in the coupled position the main body (2) can be screwed to a fitting outlet (3) by the handle (5).

8 Claims, 6 Drawing Sheets

(56) References Cited

FOREIGN PATENT DOCUMENTS

| | | | |
|---|---|---|---|
| DE | 202010017394 | U1 | 9/2011 |
| DE | 102015014309 | | 5/2017 |
| EP | 1672129 | | 6/2006 |
| EP | 2971384 | | 8/2018 |
| WO | 2018050285 | | 3/2018 |

* cited by examiner

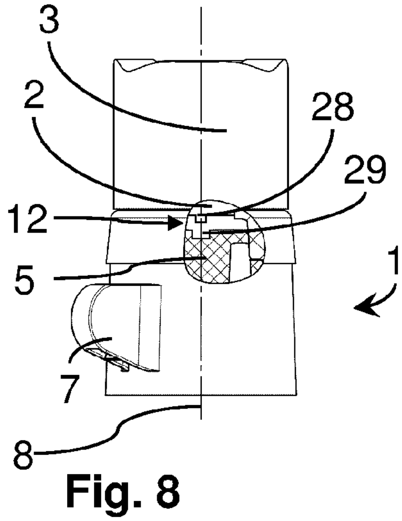
Fig. 8
Fig. 11
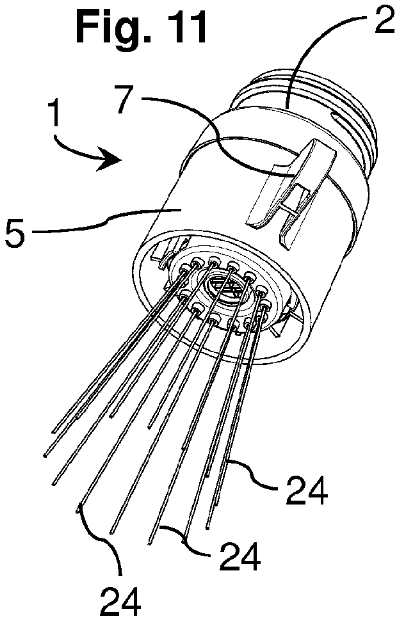
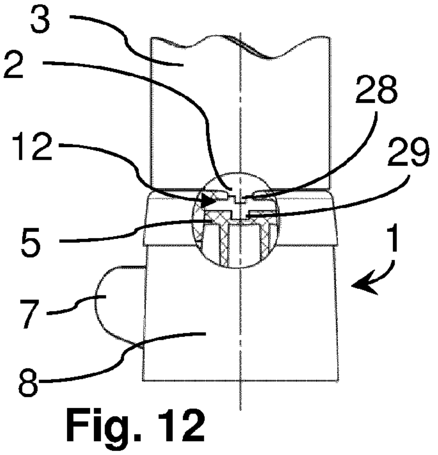
Fig. 12
Fig. 15
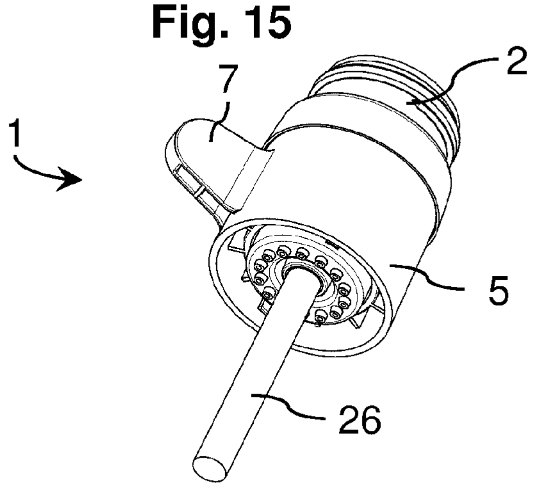

SANITARY OUTLET UNIT AND METHOD FOR INSTALLING AND/OR REMOVING A SANITARY OUTLET UNIT OF THIS TYPE

CROSS-REFERENCE TO RELATED APPLICATIONS

This application is a 371 National Phase of International Application No. PCT/EP2021/079415, filed Oct. 22, 2021, which claims priority from German Patent Application NO. 20 2020 106 639.0, filed Nov. 19, 2020, both of which are incorporated herein by reference as if fully set forth.

TECHNICAL FIELD

The invention relates to a sanitary outlet unit comprising a main body, which is configured to be screwed to a fitting outlet, and comprising a handle, a screwing movement of the main body being able to be driven thereby.

The invention further relates to a method for installing and/or removing a sanitary outlet unit on a fitting outlet, wherein a screwing movement of a main body of the sanitary outlet unit relative to the fitting outlet is driven by a handle.

BACKGROUND

It is known to fasten sanitary outlet units, which for example have an aerator or a jet former, to a fitting outlet of a fitting, by the outlet unit being screwed into an internal thread or onto an external thread of the fitting. To this end, specially shaped tools are frequently used. It has also been proposed to provide the drive by means of a coin which is inserted into a suitable slot on the outlet unit.

SUMMARY

The object of the invention is to improve the usage properties of a sanitary outlet unit.

In order to achieve the aforementioned object according to the invention one or more of the features of disclosed herein are provided. In particular, in order to achieve the aforementioned object in a sanitary outlet unit of the type mentioned in the introduction it is thus proposed according to the invention that the handle can be adjusted between a coupled position in which a drive connection is present with the main body and an uncoupled position in which the drive connection is interrupted. Thus the handle can be used for driving the screwing movement and it is possible to achieve in a simple manner that the sanitary outlet unit is not inadvertently unscrewed. A separate tool for driving the screwing movement can be dispensed with. The option for a screw fastening can be integrated in an attractive exterior.

The drive connection can be produced, for example, by means of a coupling. In the coupling, for example, a coupling part and a counter-coupling part can positively engage in one another.

In an advantageous embodiment it can be provided that the handle can be axially adjusted relative to the main body. Thus it can be achieved that a coupling or uncoupling can be performed at any time independently of the rotational movement of the drive, by a further axis of movement being used.

In an advantageous embodiment it can be provided that in the uncoupled position the handle is operatively connected to a switching device between at least two water conduits. This provides a dual use of the degree of freedom of the rotational movement.

It is particularly advantageous if the drive connection can be coupled in both positions of the switching device.

In an advantageous embodiment it can be provided that a fixing element is configured to hold the handle automatically in the uncoupled position and/or in the coupled position. Thus a fixing is possible in a simple manner, for example, by a corresponding latching mechanism in one of the two positions or in two positions.

It can also be provided that a restoring element is configured, the restoring element producing the uncoupled position. This can assist in avoiding an inadvertent release of the screw connection.

In an advantageous embodiment it can be provided that in the uncoupled position the handle is arranged so as to be movable in a freely rotatable manner at least beyond limit stops. Thus the uncoupled position can be easily perceived and readily differentiated from the coupled position.

Preferably, in the uncoupled position the handle can be arranged so as to be movable freely by a full revolution. This can assist in avoiding accidental or undesired actuation (accidental or undesired release) of the screw connection.

In an advantageous embodiment it can be provided that an axial adjustment path of the handle relative to the main body is limited at least on one side or even on both sides. Thus it can be perceived in a simple manner when a position is reached or when switching takes place between the uncoupled position and the coupled position.

Alternatively or additionally, the features of the alternative independent claim relating to a method are provided in order to achieve the aforementioned object according to the invention. In particular, therefore, in order to achieve the aforementioned object in a method for installing and/or removing a sanitary outlet unit of the type described in the introduction, it is proposed according to the invention that the handle for the drive is adjusted into a coupled position in which a drive connection is present with the main body. Thus it is possible to actuate the screw connection without the use of tools. An undesired release in the uncoupled position can be avoided in a simple manner.

A preferred application of the invention provides that in the method according to the invention a sanitary outlet unit according to the invention is used, in particular as described above or according to one of the claims relating to a sanitary outlet unit. Thus the described advantages can be used when installing and/or removing the sanitary outlet unit.

Preferably, the handle has a sliding surface for a positive manual introduction of a torque.

BRIEF DESCRIPTION OF THE DRAWINGS

The invention is now described in more detail with reference to an exemplary embodiment but is not limited to the exemplary embodiment. Further exemplary embodiments result from combining the features of individual claims or a plurality of claims with one another and/or with individual features or a plurality of features of the exemplary embodiment.

In the drawings:

FIG. 8 shows the sanitary outlet unit of FIG. 1 in a partially sectional view, FIG. 11 shows the sanitary outlet unit in the position according to FIG. 10 in a three-dimensional oblique view from below of the outlet side with the associated jet pattern, FIG. 12 shows the sanitary outlet unit of FIG. 1 in a partially sectional view in a second switching position, FIG. 15 shows the sanitary outlet unit in the position according to FIG. 12 in a three-dimensional oblique view from below of the outlet side with the associated jet pattern.

DETAILED DESCRIPTION

Figure 1:
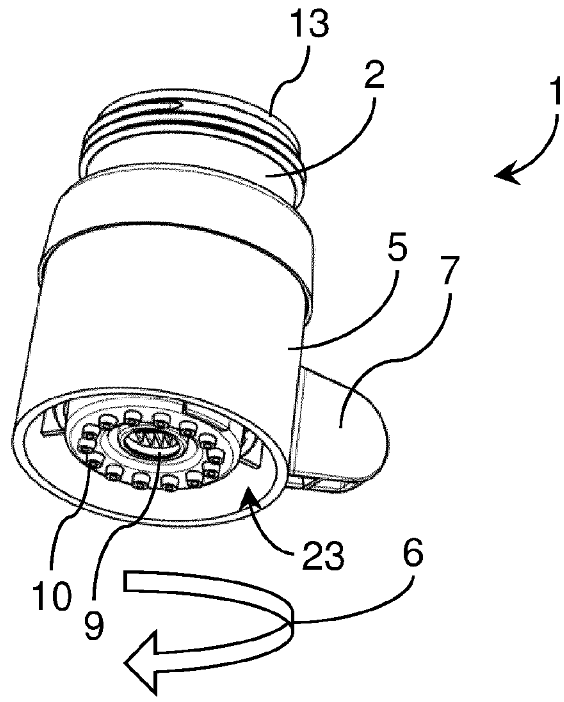
FIG. 1 shows a sanitary outlet unit according to the invention in a three-dimensional oblique view from below.

FIG. 1 shows a sanitary outlet unit denoted as a whole by 1. The sanitary outlet unit 1 has a main body 2 via which it is screwed to a fitting outlet 3 of a fitting, not shown further.

A seal 4 seals the passage from the fitting outlet 3 to the main body 2.

The sanitary outlet unit 1 also has a handle 5 via which a screwing movement 6 can be driven. In order to increase the torque which can be introduced, the handle 5 has at least one sliding surface 7. These sliding surfaces 7 can be configured on both sides on the handle 5 in order to permit a drive in both rotational directions.

The screwing movement path 6 is oriented about a longitudinal axis 8 so that the main body 2 can be screwed in or screwed out.

Figure 2:
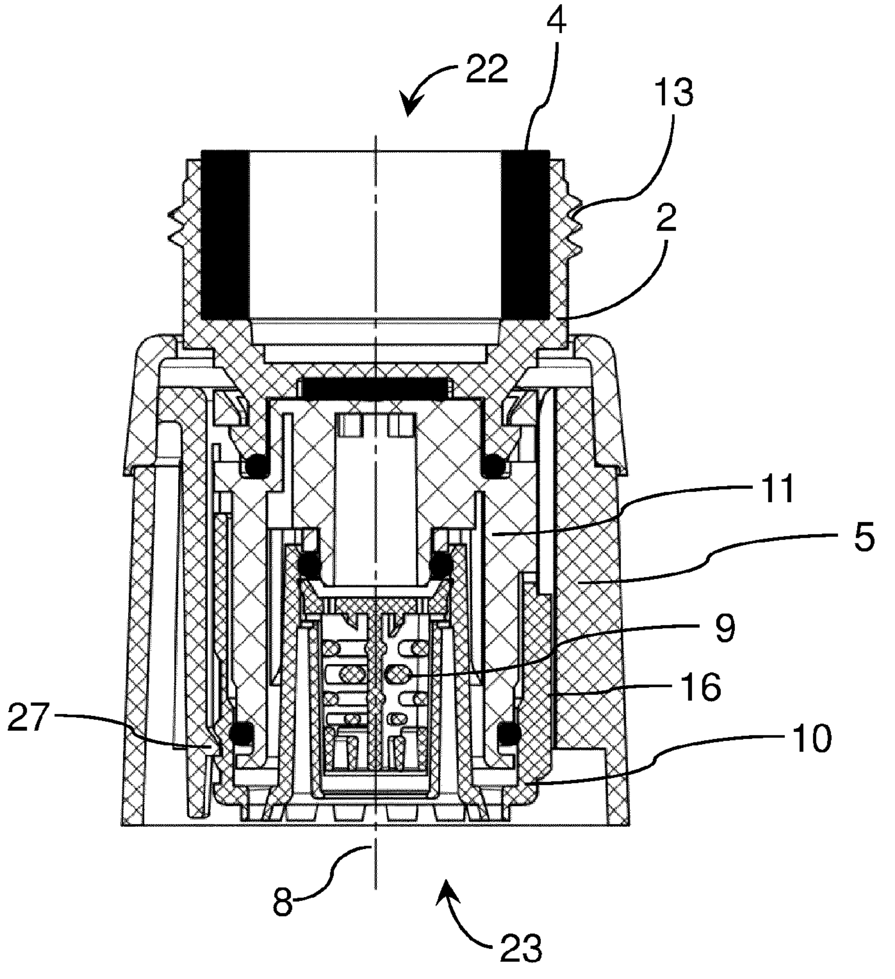
FIG. 2 shows the sanitary outlet unit of FIG. 1 in an axial section.

FIG. 2 shows a sectional view of the sanitary outlet unit 1. A first jet former 9 and a second jet former 10 are configured in the interior.

These jet formers 9, 10 serve to set a desired jet pattern.

Additionally or alternatively, in further exemplary embodiments aerators can be arranged in the interior of the outlet unit 1, a flow rate being able to be reduced thereby and/or a desired value which is independent of pressure being able to be set thereby.

Figure 3:
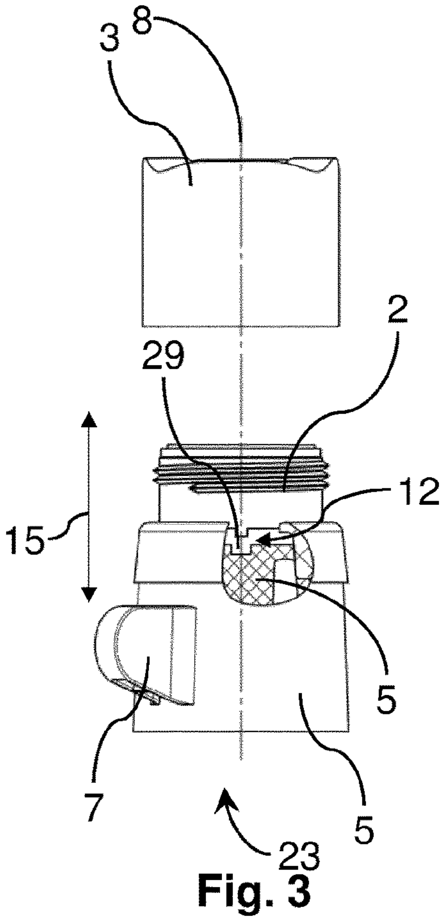
FIG. 3 shows the sanitary outlet unit of FIG. 1 in a partially sectional view before installing on a fitting.
Figure 4:
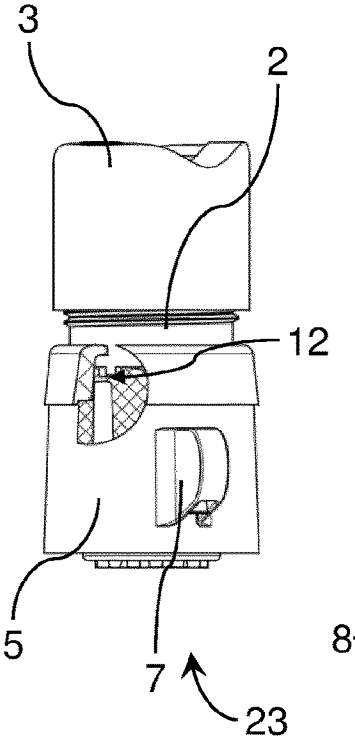
FIG. 4 shows the sanitary outlet unit of FIG. 1 in a partially sectional view on the fitting outlet of a fitting.
Figure 5:
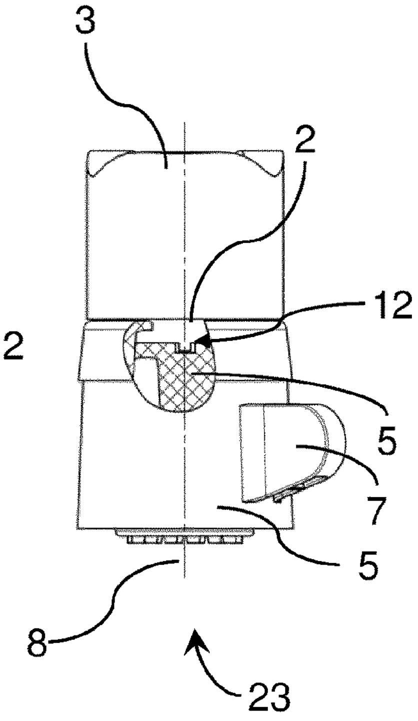
FIG. 5 shows the sanitary outlet unit of FIG. 1 in a partially sectional view in the screwed-in position.

FIGS. 3-5 show a use of the sanitary outlet unit 1 as intended. FIGS. 4 and 5 show a coupled position in which a drive connection is produced between the handle 5 and the main body 2 by means of a coupling 12.

In this coupled position, the sanitary outlet unit 1 can be mounted on the fitting outlet 3 or released from the fitting outlet 3 by the screwing movement 6.

FIG. 3 accordingly shows the uncoupled position in which the coupling 12 is released and thus a drive connection from the handle 5 to the main body 2 is interrupted.

In this position, the main body 2 cannot be screwed by means of the handle 5.

In the exemplary embodiment shown, an external thread 13 is configured on the main body 2, the external thread being able to be screwed into a corresponding internal thread 14 in the fitting outlet 3.

In further exemplary embodiments, not shown in the figures, an internal thread is configured on the main body 2, the internal thread being able to be screwed onto a corresponding external thread on the fitting outlet 3.

By comparing FIGS. 3-5 it is clear that the handle 5 can be moved to and fro by an axial adjustment movement 15 between the coupled position (FIG. 4 and FIG. 5) and the uncoupled position (FIG. 3).

Figure 6:
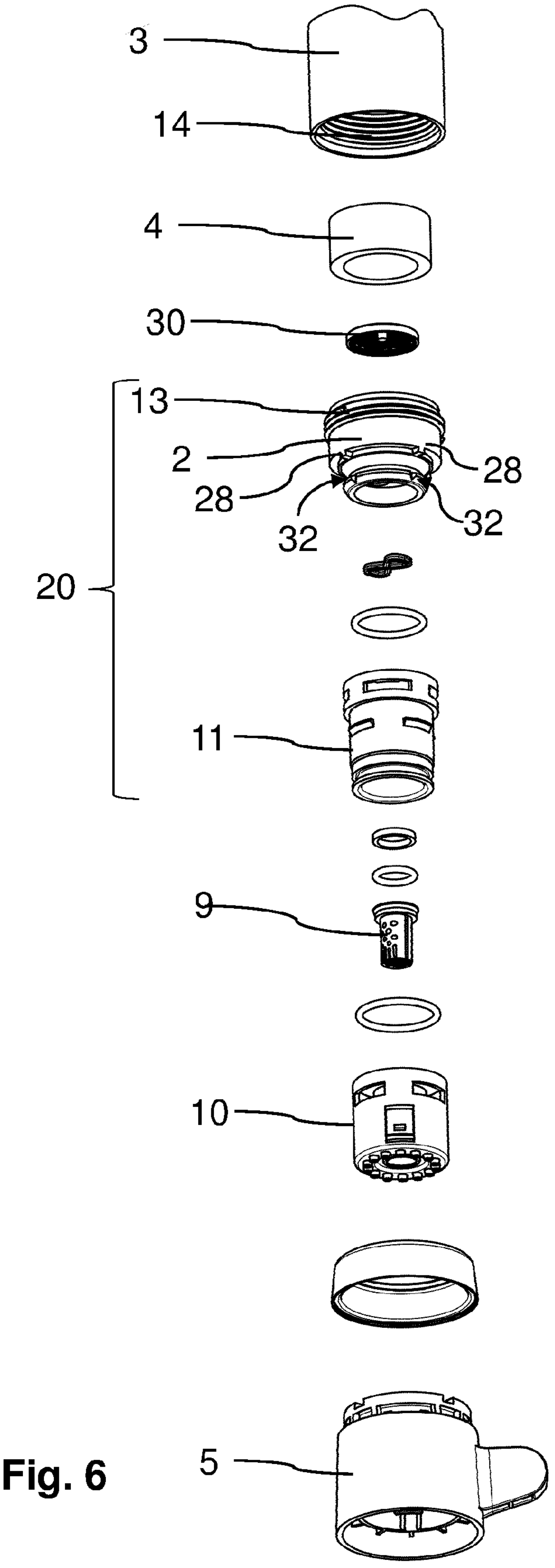
FIG. 6 shows the sanitary outlet unit of FIG. 1 in a three-dimensional exploded view from below of the outlet side.
Figure 7:
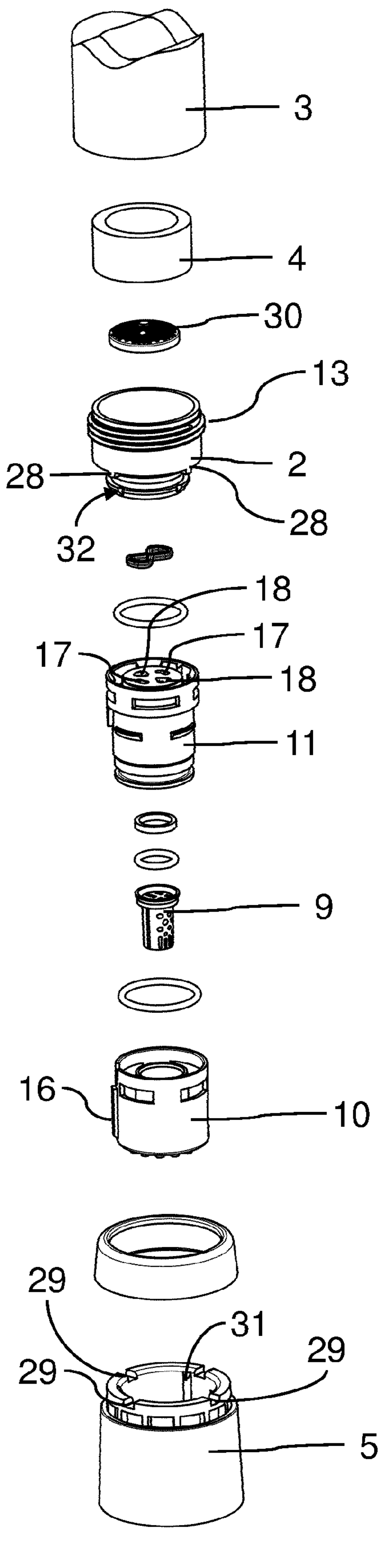
FIG. 7 shows the sanitary outlet unit of FIG. 1 in a three-dimensional exploded view from above of the inflow side.
Figure 10:
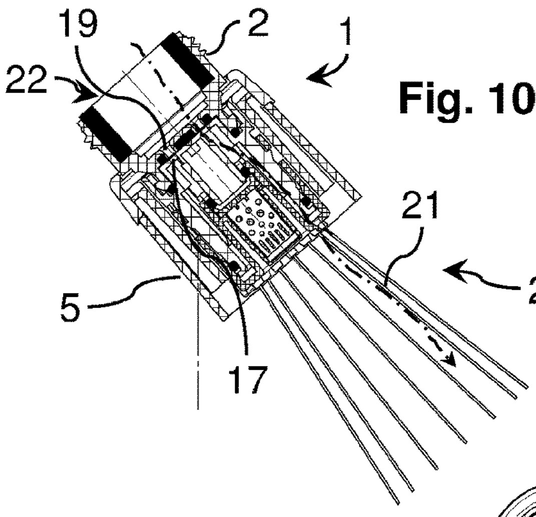
FIG. 10 shows the sanitary outlet unit of FIG. 1 in an axial section corresponding to the cutting plane in FIG. 9 with the associated jet pattern.
Figure 9:
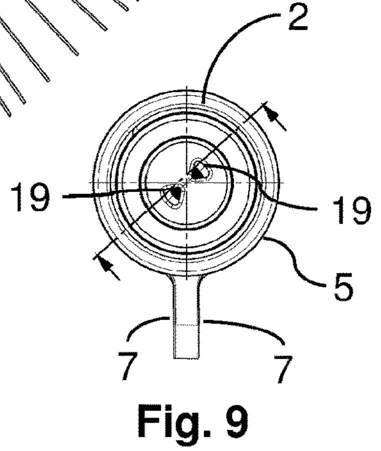
FIG. 9 shows the sanitary outlet unit of FIG. 1 in a view from above of the inflow side in a position according to FIG. 8.
Figure 14:
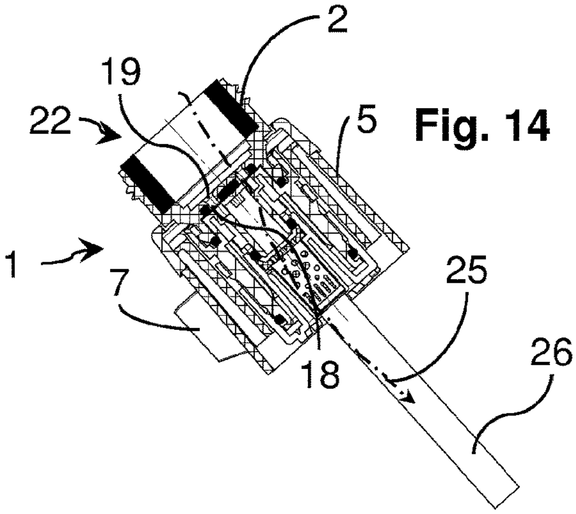
FIG. 14 shows the sanitary outlet unit of FIG. 1 in an axial section corresponding to the cutting plane in FIG. 13 with the associated jet pattern.
Figure 13:
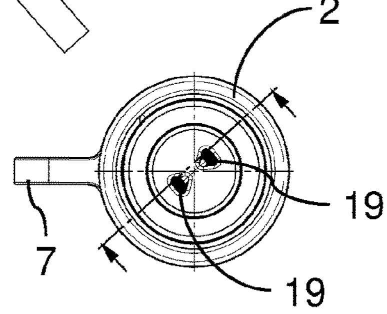
FIG. 13 shows the sanitary outlet unit of FIG. 1 in a view from above of the inflow side in a position according to FIG. 12.

FIGS. 6 and 7 show an exploded view of the sanitary outlet unit 1.

The jet formers 9, 10 are arranged on the internal part 11 which is fastened to the main body 2 so as to be rotatable about the longitudinal axis 8.

The handle 5 is connected fixedly in terms of rotation but axially movably to the jet former 9 by a sliding guide 16.

The sliding guide 16 engages in a corresponding guide groove 31 on the handle 5.

The jet former 9 is arranged inside the jet former 10 so that the jet former 9 forms a central jet 26, while the jet former 10 forms a jet with an annular cross section.

Two pairs of inlet openings 17 are configured on the internal part 11, wherein a first pair leads to the jet former 9 and a second pair leads to the jet former 10.

Corresponding outlet openings 19 are configured in the main body 2 (see FIGS. 9 and 10 or 13 and 14) which can be selectively brought into congruence with the first inlet openings 17 or the second inlet openings 18.

Thus a switching device 20 can be configured, the function thereof being explained in more detail in FIGS. 8-15. FIG. 8 shows the sanitary outlet unit 1 in the uncoupled position.

In this uncoupled position, a rotational movement of the handle 5 about the longitudinal axis 8 does not lead to a screwing movement 6 of the main body 2 but merely to a rotational movement of the internal part 11 with the jet formers 9, 10. In a first rotational position, according to FIGS. 9 to 11, the outlet openings 19 are arranged so as to correspond to the first inlet openings 17, so that a first water conduit 21 is formed from the inflow side 22 via the jet former 9, 10 to the outflow side 23. The second inlet openings 18 are closed.

As a result, a jet emerges with an overall annular cross section which is formed from single jets 24.

If the handle 5 is rotated by 90° in the uncoupled position, the outlet openings 19 are located opposite the second inlet openings 18 while the first inlet openings 17 are closed.

Thus a second water conduit 25 is formed from the inflow side 22 via the jet former 9 to the outflow side 23. A central jet 26 thus emerges from the sanitary outlet unit 1.

If the sanitary outlet unit 1 is to be removed, however, the coupling 12 is coupled again by the axial adjustment movement 15 of the handle 5. In this coupled position, no switching takes place between the water conduits 21, 25.

In FIG. 2, in which the uncoupled position is shown, a latching mechanism 27 is visible as a fixing element, the handle 5 being axially fixed thereby relative to the internal part 11.

As a result, it can be achieved that the coupled position is not inadvertently reached during use.

Alternatively or additionally, in further exemplary embodiments, a restoring element can be clamped between the handle 5 and the main body 2 in order to force the uncoupled position.

The coupling 12 is formed by projections 28 on the main body 2 (as the coupling part), the projections engaging in recesses 29 on the handle 5 (as the counter-coupling part) in the uncoupled position.

Due to the symmetry of the arrangement of the projections 28 and the recesses 29, the coupling 12 can be coupled in both positions of the switching device 20. This can be identified in FIGS. 8 and 12.

A dome screen 30 covers the inlet openings 17, 18 on the inflow side.

The handle 5 is freely rotatable about the longitudinal axis 8. Latching means 32 enable the positions of the switching device 20 to be perceived in a tangible manner.

In other exemplary embodiments, the switching device 20 can also have limit stops, the handle 5 being freely rotatable therebetween.

In the sanitary outlet unit 1 according to the invention, it is thus proposed to arrange a main body 2 and a handle 5, which is accessible from outside, so as to be movable relative to each other between a coupled position and an uncoupled position, so that in the coupled position the main body 2 can be screwed to a fitting outlet 3 by means of the handle 5.

LIST OF REFERENCE SIGNS

- 1 Sanitary outlet unit
- 2 Main body
- 3 Fitting outlet
- 4 Seal
- 5 Handle
- 6 Screwing movement
- 7 Sliding surface
- 8 Longitudinal axis
- 9, 10 Jet former
- 11 Internal part
- 12 Coupling
- 13 External thread
- 14 Internal thread
- 15 Axial adjustment movement
- 16 Sliding guide
- 17 (First) inlet opening
- 18 (Second) inlet opening
- 19 Outlet opening (of main body 2)
- 20 Switching device
- 21 (First) water conduit
- 22 Inflow side
- 23 Outflow side
- 24 Single jet
- 25 (Second) water conduit
- 26 Central jet
- 27 Latching mechanism
- 28 Projection
- 29 Recess
- 30 Dome screen
- 31 Guide groove
- 32 Latching means

The invention claimed is:

1. A sanitary outlet unit (1), comprising:

a main body (2) configured to be screwed to a fitting outlet (3);

a handle (5) by which a screwing movement (6) of the main body (2) is drivable;

wherein the handle (5) is adjustable between a coupled position in which a drive connection is present with the main body (2) and an uncoupled position in which the drive connection is interrupted; and a movable internal part (11) having flow paths that are adapted to be located in a path of at least first and second water conduits (21, 25), and in the uncoupled position the handle (5) is operatively connected to the movable internal part (11) such that movement of the handle (5) switches a flow from one of the first or the second water conduits to another of the first or the second water conduits (21, 25).

2. The sanitary outlet unit (1) as claimed in claim 1, wherein the handle (5) is axially adjustable relative to the main body (2).

3. The sanitary outlet unit (1) as claimed in claim 1, wherein an axial adjustment path of the handle (5) relative to the main body (2) is limited on at least one side.

4. The sanitary outlet unit (1) as claimed in claim 1, wherein two pairs of inlet openings (17) are provided in the internal part (11) which are adapted to be selectively brought into congruence with the first inlet openings (17) or the second inlet openings (18) by movement of the handle (5) forming a switching device (20) to allow switching of a flow from one of the first or second water conduits to the other of the first or second water conduits (21, 25).

5. The sanitary outlet unit (1) as claimed in claim 1, wherein in the uncoupled position the handle (5) is arranged so as to be movable in a freely rotatable manner at least beyond limit stops.

6. A sanitary outlet unit (1), comprising:

a main body (2) configured to be screwed to a fitting outlet (3);

a handle (5) by which a screwing movement (6) of the main body (2) is drivable;

wherein the handle (5) is adjustable between a coupled position in which a drive connection is present with the main body (2) and an uncoupled position in which the drive connection is interrupted; and a latch configured to retain the handle (5) automatically in at least one of the uncoupled position or the coupled position.

7. A method for at least one of installing or removing a sanitary outlet unit (1) on a fitting outlet (3), the method comprising:

providing a sanitary outlet unit (1), having a main body (2) configured to be screwed to a fitting outlet (3), a handle (5) by which a screwing movement (6) of the main body (2) is drivable, wherein the handle (5) is adjustable between a coupled position in which a drive connection is present with the main body (2) and an uncoupled position in which the drive connection is interrupted, and a movable internal part having flow paths that are adapted to be located in a path of at least first and second water conduits (21, 25), and in the uncoupled position the handle (5) is operatively connected to the movable internal part such that movement of the handle switches a flow from one of the first or the second water conduits to another of the first or the second water conduits (21, 25);

adjusting the handle (5) on the main body (2) of the sanitary outlet unit (1) into the coupled position in which a drive connection is present with the main body (2); and driving a screwing movement (6) of the main body (2) of the sanitary outlet unit (1) relative to the fitting outlet (3) by the handle (5).

8. The method of claim 7, wherein the handle (5) is adjusted by an axial adjustment movement (15) of the handle (5).

* * * * *